United States Patent [19]

Keller

[11] Patent Number: 4,726,565

[45] Date of Patent: Feb. 23, 1988

[54] POST PULLER

[76] Inventor: Joseph A. Keller, R.R. #1, Box 187, Beulah, N. Dak. 58523

[21] Appl. No.: 891,112

[22] Filed: Jul. 31, 1986

[51] Int. Cl.[4] .............................................. E21B 19/00

[52] U.S. Cl. ...................................................... 254/30

[58] Field of Search ................. 254/29 R, 30, 31, 132, 254/DIG. 1; 269/70; 294/82.21, 82.23

[56] References Cited

U.S. PATENT DOCUMENTS

| | | | |
|---|---|---|---|
| 1,056,516 | 3/1913 | Drake | 254/31 |
| 1,522,979 | 1/1925 | Ratigan | 294/82.23 |
| 1,666,454 | 4/1927 | Johnson . | |
| 1,761,675 | 6/1930 | Mick . | |
| 1,848,426 | 2/1930 | Kvall . | |
| 2,436,510 | 3/1945 | Ferguson . | |
| 4,161,310 | 7/1979 | Parker | 254/30 |
| 4,203,577 | 5/1980 | Hafner | 254/DIG. 1 |
| 4,422,621 | 12/1983 | Ekern | 254/30 |

FOREIGN PATENT DOCUMENTS 48364 6/1966 German Democratic Rep. .

*Primary Examiner*—Robert C. Watson

*Attorney, Agent, or Firm*—Schroeder & Siegfried

[57] ABSTRACT

A post puller having substantially universal application for pulling posts of various cross-sectional configurations and characterized by a pair of transversely spaced jaws carried by the pulling clevis opposite the clevis pin, the clevis being pivotally connected adjacent one end of a lever handle which is pivotally supported by a stand, the space between the jaws accommodating the leg of T-shaped posts, and the jaws engaging the base of the U-shaped posts, during the pulling operation.

8 Claims, 3 Drawing Figures

POST PULLER

DESCRIPTION

BACKGROUND OF THE INVENTION

The present invention relates to a post puller which may be operated as a jack to provide great leverage for pulling posts or the like from the ground. More particularly it relates to a fence post puller adapted for lifting metal posts of the studded or plain T-type, angletype or U-shaped from the ground.

Metal fence posts often called "steel posts" are employed in many applications such as on farms, ranches, or construction sites for fences and along highways for signs, markers or snowfencing. They are relatively easy to install but sometimes need to be removed or repositioned. Removal or repositioning of the depth of a steel post is difficult without a post puller.

Various prybars and long handled jacks have been employed to lift fence posts out of the ground. Known fence post pullers tend to be large and clumsy or offer little mechanical advantage. One major problem with known fence post pullers is their inability to adequately grip a fence post. Slippage between the fence post puller and the post to be pulled can be dangerous or at the least very frustrating. Another disadvantage of known fence post pullers is the inability to attach to posts having an attached fence fabric such as barbed wire.

SUMMARY OF THE INVENTION

The present invention offers a fence post pulling apparatus having a handle acting as a lever pivotally attached to a ground engaging fulcrum stand with a clevis attached to the end of the lever handle nearest the fulcrum stand. The clevis encircles and engages a central portion of the post. Downward motion on the lever arm causes the clevis to positively engage the post pulling it upward. When the lever arm is raised, the clevis releases its grip on the post sliding down in a ratchet-like fashion to a lower point on the post, reengaging it in a non-slipping manner.

The fulcrum stand terminates in a foot which is disk shaped having an outer circumferal lip. The disk shape stabilized the stand in contact with the ground while the circumferal lip prevents the stand from sinking too deeply into the ground.

The post puller is light weight, being small in size and foldable for easy storage or carrying.

BRIEF DESCRIPTION OF THE FIGURES

A detailed description of one preferred embodiment of the POST PULLER is hereafter described with specific reference being made to the drawings in which.

DESCRIPTION OF THE PREFERRED EMBODIMENT

Figure 1:
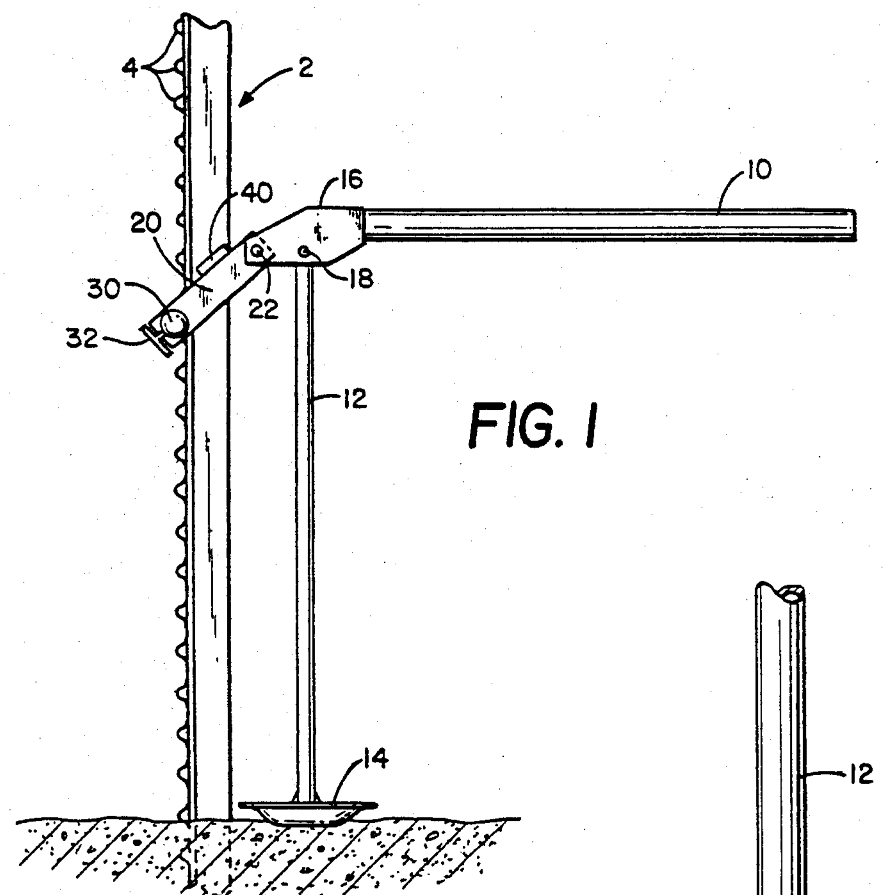
FIG. 1 is a side-elevation of a fence post puller constructed in accordance with the present invention applied to a post to extract the same from the ground.

Referring now more particularly to the drawings, in FIG. 1 is shown a well known type of studded T-post 2 having raised studs 4. The post puller, comprising the invention, includes a handle 10 acting as a lever pivotally connected with fulcrum stand 12 having a ground engaging dish-shaped foot 14. Mounting 16 serves to pivotally attach the handle 10 via pin 18 to the stand 12 and additionally mounts clevis 20 via pin 22 to lever handle 10.

Figure 2:
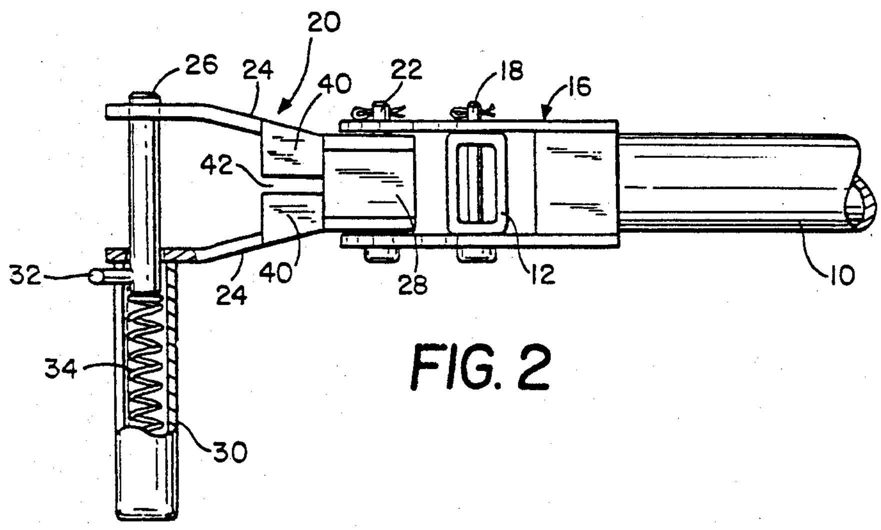
FIG. 2 is an enlarged top-view of the post engaging clevis of the present invention.

Clevis 20 is made up of straps 24 shaped in the form of a U and held together by spacer block 28 through which pin 22 would be positioned. As shown in FIG. 2 which is a top view of the clevis, pin 26 slidably mounts the clevis to the post to be pulled. Pin 26 is held captive within a tubular holder 30 which has a spring 34 which urges pin 26 to its outward extended position. In use pin 26 is pulled back by pin handle 32 and the jack is placed in a position to allow the clevis to encircle the post to be pulled and pin handle 32 is released which allows spring 34 to push pin 26 from one side of the clevis through the other side. This unique arrangement allows for a quick and easy engagement of the clevis to a central portion of the post to be pulled relieving the need for manual insertion, prevents fumbling with pin 26 or the possibility of losing it.

An additional feature of the clevis are the crossplates or jaws 40 which are placed there to restrict the size of the opening of the clevis and to allow the same clevis to be used on many different shapes of posts, particularly U-shaped posts used along highways for signs and markers or in older fence lines. Space or slot 42 between crossplates 40 adapts the clevis for use with T-shaped and angle posts. The crossplates 40 are mounted on top of clevis straps 24 typically by welding and provide for early contact to the post 2 to clamp the post between the crossplates and post engagement pin 26.

In the use of the device, the post puller is first placed in a position adjacent to the post to be pulled. Then, Pin 26 is drawn back by handle 32 and the clevis placed in engagement with the post. The clevis is attached directly at the proper jacking height without the need to slip the clevis over the top of the post. It is desirable that the jack be used in as near an upright position as possible but would work in a reasonably inclined position also. Next the handle end of the lever is oscillated vertically. As the handle is depressed, the clevis will tend to pivot upon pin 22 so that pin 26 and crossplates 40 engage against their respective adjacent faces of the post, clamping the post at the postconfronting end of the lever handle. Downward movement of the handle raises the post. As the handle-end of the lever is moved upwardly, the frictional engagement of the clevis with the post will tend to retard downward movement thereof with the result that the pivot point at pin 22 will move downward with respect to the clevis 20 thereby disengaging pin 26 and crossplates 40 from the post so that the clevis 20 falls freely downardly to a lower position on the post. The whole operation of the post puller is in a ratchet-like manner alternately gripping and releasing the post.

Figure 3:
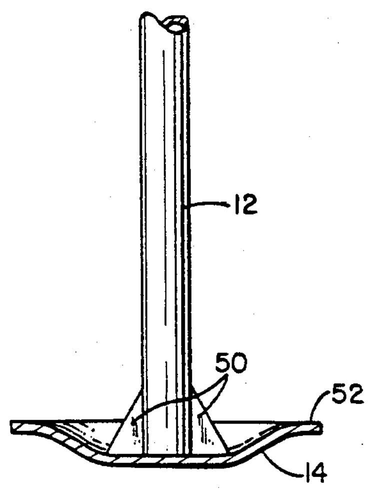
FIG. 3 is a sectional view of the base stand of FIG. 1.

Shown in FIG. 3 is an expanded cross-sectional view of foot 14. The shape of the foot 14 is in the form of a dish to allow self-centering of the stand to prevent movement when it is placed upon the ground. The outer edge of the foot 14 is in the shape of a flattened circumferal lip as shown by numeral 52. If jack is operated in loose or soft earth, the dish-shaped of 14 will settle into the earth making the stand very stable to lateral movements but not to vertical sinking into the ground. To prevent sinking into the ground, soil that does move out of the way of dish shape 14 is caught by lip 52 and this tends to retard any further vertical settling into the ground due to the pressure exerted upon the fence post puller by lever handle 10. Reinforcement of the stand to foot connection is accomplished by angle braces 50.

The invention is able to engage a post without having to remove any fence wire or fabric being held by the post. The clevis as presently designed is able to handle various sizes and shapes of posts. It is anticipated that if the present clevis is not adequate for a certain shape or size of post that a redesign could be made including the features of the invention as described. Since the construction hereinbefore set forth is capable of a certain range of change or modification without materially departing from the spirit of the invention, I do not limit myself to such specific structure except as hereinafter claimed.

What is claimed:

1. A post-pulling apparatus comprising:

(a) a fulcrum stand having a ground-engaging foot at one of its ends;

(b) a lever handle pivotally mounted at a point intermediate its ends on said fulcrum stand;

(c) a generally U-shaped clevis pivotally attached to said lever handle adjacent one of its ends and outwardly of the point of attachment of said lever handle to said fulcrum stand and being constructed and arranged to clampingly engage a post to be pulled;

(d) said clevis having a pair of spaced opposite legs extending outwardly relative to its point of attachment to said lever handle and having free ends;

(e) a clevis pin extending between said free ends of said clevis;

(f) a pair of transversely spaced jaws carried by said clevis opposite said clevis pin and spaced therefrom at locations between said clevis pin and the point of pivotal attachment of said clevis to said lever handle;

(g) said jaws being constructed and arranged to define a space therebetween sufficient to receive the leg of a T-shaped post therebetween;

(h) said jaws, said legs and said clevis pin being constructed and arranged to define a space therebetween which will receive either U-shaped, T-shaped, or angle posts therewithin in clamping engagement.

2. The apparatus of claim 1 wherein the ground-engaging foot is dish-shaped and has a flattened circumferential lip.

3. The apparatus of claim 1 wherein said clevis pin includes a permanently attached spring-loaded post engagement pin.

4. The apparatus of claim 3 wherein said jaws comprise a pair of spaced apart crossplates.

5. The apparatus of claim 1 wherein the clevis comprises a permanently attached spring-loaded post engagement pin.

6. The apparatus defined in claim 1, wherein the space between said jaws is a narrow elongated slot extending longitudinally of said clevis legs.

7. The apparatus defined in claim 1, wherein the space between said jaws, said legs, and said clevis pin is slightly greater than the cross-sectional dimensions of a U-shaped post.

8. A post-pulling apparatus comprising:

(a) a fulcrum stand having a ground-engaging foot at one of its ends;

(b) a lever handle pivotally mounted at a point intermediate its ends on said fulcrum stand;

(c) a generally U-shaped clevis pivotally attached to said lever handle adjacent one of its ends and outwardly of the point of attachment of said lever handle to said fulcrum stand and being constructed and arranged to clampingly engage a post to be pulled;

(d) said clevis having a pair of spaced opposite legs extending outwardly relative to its point of attachment to said lever handle and having free ends;

(e) a clevis pin extending between said free ends of said clevis;

(f) a pair of transversely spaced post-engaging jaws, one each of which is connected to one of said legs adjacent the point of pivotal attachment of said clevis to said lever handle;

(g) said jaws extending transversely of said legs and being constructed and arranged to define a space therebetween to receive the leg of a T-shaped post therebetween; and (h) said jaws, said legs and said clevis pin being constructed and arranged relative to each other to define a space therebetween which will receive either U-shaped, T-shaped, or angle posts therewithin in clamping engagement.

* * * * *

UNITED STATES PATENT AND TRADEMARK OFFICE

CERTIFICATE OF CORRECTION

PATENT NO. : 4,726,565

DATED : February 23, 1988

INVENTOR(S) : Joseph A. Keller

It is certified that error appears in the above-identified patent and that said Letters Patent is hereby corrected as shown below:

Claim 4, line 7, the numeral "3" should read --1--.

Signed and Sealed this

Twenty-second Day of November, 1988

*Attest:*

DONALD J. QUIGG

*Attesting Officer* *Commissioner of Patents and Trademarks*